Sept. 20, 1949.　　　　G. S. GEDDES　　　　2,482,411
MICROMETRIC CALIPER
Filed Jan. 3, 1946
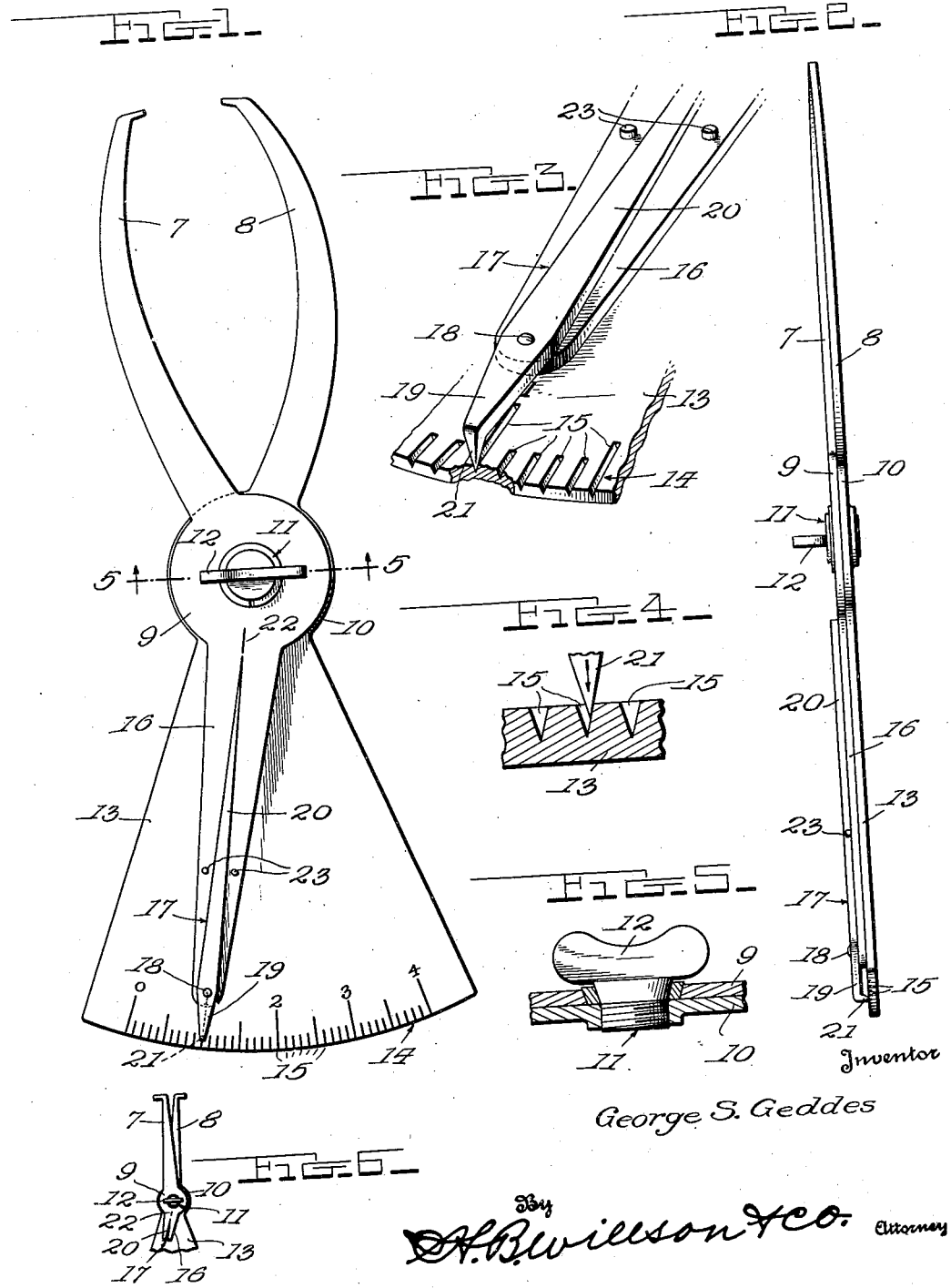
Inventor
George S. Geddes Patented Sept. 20, 1949

2,482,411

UNITED STATES PATENT OFFICE 2,482,411

MICROMETRIC CALIPERS

George S. Geddes, Vandalia, Ill.

Application January 3, 1946, Serial No. 638,842

2 Claims. (Cl. 33—148)

The invention aims to provide new and improved machinist's calipers (either outside or inside) which may be easily set without the necessity of measuring from one work-gauging arm to the other, and moreover, may be set with micrometric accuracy.

Figure 1 of the accompanying drawing is a side elevation showing outside calipers constructed in accordance with the invention.

Fig. 2 is an edge view.

Fig. 3 is an enlarged fragmentary perspective view, partly broken away and in section, showing the manner in which a prong on a pointer is cooperable with scale-forming grooves in a sector.

Fig. 4 is a further enlarged detail sectional view illustrating the manner in which the aforesaid prong "finds" the bottom of any groove into which it is inserted.

Fig. 5 is a detail transverse section on line 5—5 of Fig. 1.

Fig. 6 is a fragmentary side elevation showing inside calipers, constructed in accordance with the invention.

In the drawing above briefly described, a preferred construction has been illustrated, and while that construction will be specifically described, attention is invited to the possibility of making minor variations within the scope of the invention as claimed.

The work-gauging arms are denoted at 7 and 8, said arms having integral hubs 9 and 10 respectively. These arms are pivotally connected by a suitable clamping pivot 11 which includes a thumb-screw or the like 12 by means of which it may be tightened and loosened.

Integral with the hub 10 of the arm 8, is a sector 13 having a scale 14 denoting distances which the arms 7 and 8 may be opened. The scale marks of this scale 14 are formed by sharply cut radial grooves 15 of V-shape in transverse section. I prefer that the scale be graduated in tenths of an inch but any other units of measurement could of course be employed, if desired.

A pointer-carrying finger 16 is integral with the hub 9 of the arm 8 and is disposed at the scale-carrying side of the sector 13, said finger 16 preferably extending substantially to said scale as shown. A pointer 17 is pivoted between its ends at 18 to the free end of the finger 16. This pointer 17 has a short operating arm 19 and a long pointing arm 20. The free end of the short arm 19 is provided with an integral prong 21 receivable in any of the grooves 15, said prong being of such cross-sectional shape that it may rotate slightly in any selected groove as the pointer 17 swings upon its pivot 18 during relative movement of the finger 16 and sector 13. The pointing arm 20 extends longitudinally of the finger 16 and is cooperable with a stationary indicator 22 either on said finger 16 or on the hub 9, said indicator 22 being preferably in form of a sharply cut mark or groove. The movements of the pointing arm 20 are preferably limited by appropriate stops 23 rigidly carried by the finger 16. This finger is yieldably biased by its own resiliency toward the sector 13 and thus serves to force the prong 21 completely to the bottom of any groove 15 into which said prong is inserted, thus insuring that said prong shall be accurately centered in the groove.

The calipers may be accurately set to space the terminals of their work-gauging arms 7 and 8 any required distance apart. For example, to set the arms for calipering a distance of one inch, the prong 21 is positioned in the groove 15 constituting the one inch mark of the scale 14. Before this is done, the clamping pivot 11 is loosened, permitting the arms 7 and 8 to be relatively moved with ease. When moving these arms and placing the prong 21 in the selected groove, the actual spacing between the effective ends of said arms is disregarded, it being only necessary at this time that the prong 21 be in the proper groove. This having been done, the arms 7 and 8 are further moved in one direction or the other until the pointing arm 20 accurately coincides with the stationary indicator 22. When this occurs, it is known that the active ends of the arms 7 and 8 are spaced the required distance apart, with micrometric accuracy. The thumb-screw or the like 12 is then tightened and the arms thus locked in accurately set positions. Should this setting be accidentally disturbed in any way, the pointing arm 20 will give a conspicuous indication of this fact by being out of alinement with the indicator 22, and the misadjustment may thus be readily corrected. Therefore, by simply glancing at the relation of the pointing arm 20 with the indicator 22, before each use of the calipers, the machinist knows whether they are still accurately set.

From the foregoing, taken in connection with the accompanying drawing, it will be seen that novel and advantageous provision has been made for carrying out the object of the invention, and while preferences have been disclosed, attention is again invited to the possibility of making variations within the scope of the invention as claimed.

I claim:

1. Micrometric calipers comprising two work-gauging arms, a clamping pivot connecting said work-gauging arms for relative opening and closing movements, a sector rigidly connected with one of said work-gauging arms and having radial grooves forming a scale, said scale denoting distances which said arms may be opened, a finger rigidly connected with the other of said work-gauging arms and extending substantially to said scale, a pointer pivoted between its ends to the free end of said finger on an axis parallel with said clamping pivot, said pointer having a short operating arm movable along said scale and provided with a sharp prong to selectively enter the grooves forming said scale, said prong being of such cross-sectional shape that it may rotate slightly in any selected groove as said pointer swings upon its pivot during relative movement of said finger and sector, said pointer also having a long pointing arm extending longitudinally of said finger toward said clamping pivot, and a stationary indicator in fixed relation with said finger for cooperation with said long pointing arm; whereby upon loosening said clamping pivot, said work-gauging arms may be swung approximately to a required spaced relation, said prong may then be inserted into the scale groove denoting substantially the exact arr spacing required, said work-gauging arms ma then be relatively moved until said long pointin; arm coincides with said stationary indicator, an( said clamping pivot may then be tightened, there by accurately setting said work-gauging arms the exact required distance apart.

2. A structure as specified in claim 1; said grooves being V-shaped in transverse section, said finger being yieldably biased toward said sector to force said prong to the extreme bottom of any groove into which it is inserted.

GEORGE S. GEDDES.

REFERENCES CITED

The following references are of record in the file of this patent:

UNITED STATES PATENTS

| Number | Name | Date |
| --- | --- | --- |
| 284,045 | Morrill | Aug. 28, 1883 |
| 634,968 | Van Valkenburg | Oct. 17, 1899 |
| 720,947 | Miller | Feb. 17, 1903 |

FOREIGN PATENTS

| Number | Country | Date |
| --- | --- | --- |
| 4,086 | Great Britain | 1903 |